United States Patent [19]
Whitman et al.

[11] 3,956,459
[45] May 11, 1976

[54] PROCESS FOR THE ELIMINATION OF POLLUTANTS IN EXHAUST GASES

[75] Inventors: Robert Henry Whitman, Stamford, Conn.; Edward Leyman, New Rochelle, N.Y.

[73] Assignee: American Cyanamid Company, Stamford, Conn.

[22] Filed: Jan. 28, 1974

[21] Appl. No.: 437,437

Related U.S. Application Data

[62] Division of Ser. No. 254,590, May 18, 1972, Pat. No. 3,819,533.

[52] U.S. Cl. .............................. 423/213.5; 423/212
[51] Int. Cl.² ......................................... B01D 53/34
[58] Field of Search ............ 423/213.2, 213.5, 213.7

[56] References Cited
UNITED STATES PATENTS

| | | | |
|---|---|---|---|
| 3,291,564 | 12/1966 | Kearby | 423/212 |
| 3,295,919 | 8/1962 | Henderson et al. | 423/213.5 |
| 3,428,573 | 2/1969 | Reitmeier et al. | 423/213.5 X |

*Primary Examiner*—G. O. Peters
*Attorney, Agent, or Firm*—William J. van Loo

[57] ABSTRACT

An improved process for oxidation of exhaust gases emanating from internal combustion engines which utilizes a stabilized alumina support containing a uniform distribution of cupric oxide and chromic oxide as a first promoter level and thereover palladium as a second promoter level as well as the process for manufacture thereof are disclosed.

1 Claim, No Drawings

PROCESS FOR THE ELIMINATION OF POLLUTANTS IN EXHAUST GASES

This is a division of application Ser. No. 254,590, filed May 18, 1972, now U.S. Pat. No. 3,819,533.

This invention relates to an improved catalyst for oxidation of exhaust gases emanating from internal combustion engines and to the process for manufacture of such catalyst. The invention also relates to use of the improved catalyst in the treatment of such exhaust gases whereby highly effective catalyst activity is maintained over extended time periods in spite of the presence of oxides of sulfur in the exhaust gases.

The problems of air pollution associated with exhaust gases arising from internal combustion engines are well recognized and innumerable efforts have been made to overcome these problems. Much attention has been concentrated on providing catalytic muffler systems which will transform the toxic and obnoxious components into innocuous material. A wide variety of muffler devices have been provided and many are operationally sound in their mechanical functioning. Such devices, of course, require catalyst materials to effect oxidation of the exhaust gases and the effectiveness of a catalytic muffler device is, for the most part, determined by the effectiveness of the catalyst material contained therein. Thus, the problem of immediate concern with respect to catalytic muffler devices is that of developing catalyst materials which are of high initial activity and maintain high activity over long periods of use. The latter requirement stems from the fact that replacement of catalyst materials is not only inconvenient but is also laborious, expensive, and generally encourages engine operation without proper oxidation of the exhaust gases.

Numerous catalyst materials have been proposed for use in catalytic muffler devices and, while some success has been achieved, the catalysts all suffer from one or more deficiencies which limit the effectiveness of air pollution control. The requirements for an effective catalyst are many and the three most important requirements currently sought are effective low temperature activity so as to minimize time of catalyst bed warm-up so as to effect more rapid removal of air pollutants, effective long term operation at high bed temperatures which occur on lengthy continuous operations under adverse conditions, and high resistance to shrinkage during bed operation at high temperature so as to prevent attritrition of exhaust gases through spaces formed as a result of excessive catalyst shrinkage. Other properties are, of course, desirable, but need not be present at high levels so long as the properties specified are of optimum value. The particular combination of catalyst properties considered of prime importance is extremely difficult to achieve in a single catalyst material.

Because of the increasing concern of government agencies over the problems of air pollution by internal combustion engines, certain legislation has been enacted requiring automobile manufacturers to reduce drastically the level of pollutants emanating from the automobile engines and placing rigid timetables as to the effective date by which reduced air pollution must be achieved. The automobile manufacturers, aware of the problems associated with catalytic muffler devices, have effected improvements in engine efficiency which reduces air pollutants to some extent. Some of the problems associated with catalytic mufflers arise from the lead additives used to increase the apparent octane rating of fuels and improve anti-knock properties thereof. In view of the criticality of the air pollution problem, however, leaded gasolines are being banned and improved refining procedures are being employed to produce the higher octane ratings necessary. The improved engine performance coupled with the use of unleaded fuels has changed the requirements as to effective catalyst materials for use in the catalytic muffler devices, which are still contemplated. Although the fuels are to be free of lead compounds, small amounts of sulfur will continue to be present and oxides of sulfur arising from combustion of fuel continue to cause catalyst poisoning and reduce catalyst life. Prior art catalysts do not provide the resistance to poisoning by oxides of sulfur and other requirements for catalyst materials currently deemed essential.

U.S. Pat. No. 3,133,029, issued May 12, 1964 to Hoekstra, discloses a process for preparing a copper, cobalt, or nickel catalyst useful in the purification of exhaust gases from internal combustion engines. The catalyst is of low activity with respect to oxidation of hydrocarbons and does not provide the level of air pollution control desired on that account.

U.S. Pat. No. 3,224,981, issued Dec. 21, 1965 to Stephens et al., discloses a catalyst material comprising copper and palladium or alumina. This catalyst material is also deficient with respect to hydrocarbon oxidation and fails to control air pollution effectively on that account.

U.S. Pat. No. 3,288,558, issued Nov. 29, 1966 to Briggs et al., discloses a catalyst material employing copper oxide, palladium, and chromia on a support, with chromia being distributed as an outer ring on the support. This catalyst is said to be more active than prior art catalyst material because of the specific manner in which the chromia is distributed on the support. The catalyst described is more active than prior art catalysts with respect to hydrocarbon oxidation and is not readily deactivated by exhaust gases from leaded fuels, but is, however, readily deactivated by oxides of sulfur when used with unleaded fuels. The essence of the catalyst of this reference is its special distribution of the chromia content in an outer ring on the catalyst base particle. This special distribution of chromia is obtained by use of particular techniques in treating the catalyst base. A preferred procedure involves use of chromium compounds in which chromium is in the anionic portion of the molecule, such as ammonium chromate. Alternative methods include controlled evolution of water from the chromium solution in contact with the base using pressure or vacuum systems to effect the slow release of water from the solution necessary to achieve the outer ring distribution of chromia on the base. Thus, although the catalyst material of this cited reference is admirably suited for use with exhaust fumes from leaded fuels by virtue of its unique distribution of chromia thereon, the catalyst material is readily poisoned by oxides of sulfur present in exhaust fumes from the unleaded fuels now in current usage.

Thus, there exists the need for catalyst materials which are of high activity in the oxidation of hydrocarbons and carbon monoxide in exhaust gases emanating from internal combustion engines, which catalyst materials maintain their high activity over extended time periods under varying conditions of operation, are resistant to poisoning by oxides of sulfur, and continuously control air pollution to desirably low levels for lengthy time periods.

In accordance with the product aspect of the present invention, there is provided a catalyst material useful in an exhaust muffler system operating in conjunction with an internal combustion engine which catalyst material consists essentially of a stabilized alumina support uniformly impregnated with from about 2 to 10 weight percent of cupric oxide and from about 2 to 10 weight percent of chromic oxide as a first promoter level and thereover from about 0.0025 to 0.1 weight percent of palladium as a second promoter level, said percentages being based on the weight of the stabilized support.

The catalyst material of the present invention is unexpectedly superior to prior art catalyst materials in stability of activity at high operating temperatures, in resistance to poisoning by oxides of sulfur, and in dimensional stability at high temperatures of use. The catalyst material of the present invention also possesses many other desirable properties normally required of catalysts used in exhaust muffler systems, such as low density, low temperatures of conversion, high activity, and extended useful life.

The catalyst material of the present invention has a uniform distribution of cupric oxide and chromic oxide as a first promoter level and thereover has a uniform distribution of palladium as a second promoter level. The catalyst material also employs as its base material, an alumina support which is stabilized dimensionally. It is quite surprising and totally unexpected that the present catalyst should offer such outstanding properties in use in exhaust muffler systems operating in conjunction with internal combustion engines in view of the prior art teachings that a different specific distribution of promotor materials is required for effective performance.

In accordance with the process aspect of the present invention whereby the catalyst material is obtained, there is provided a process which comprises impregnating a stabilized alumina support with a homogeneous solution of a copper compound and a chromium compound and calcining the impregnated support to provide a uniform distribution thereon of from about 2 to 10 weight percent of cupric oxide and from about 2 to 10 weight percent of chromic oxide as a first promotor level and thereafter coating the calcined impregnated stabilizing support with a solution of a palladium compound and calcining the coated support to provide from about 0.0025 to 0.1 weight percent of palladium as a second promoter level, all percentages being based on the weight of the stabilized support.

In a preferred embodiment of the preparative process, the stabilized support is obtained by treating a calcined alumina support with a solution of a calcium compound and calcining the treated support at 1800°F. so as to provide from about 1.5 to 10 weight percent of calcium oxide thereon based on the weight of the calcined alumina support initially employed, the stabilization treatment being effected immediately prior to impregnation of the support with copper and chromium compounds.

In accordance with the use aspect of the present invention, there is provided a process for treating exhaust gases from internal combustion engines to oxidize the air pollutants therein which comprises contacting said gases with a catalyst material consisting essentially of a stabilized alumina support uniformly impregnated with from about 2 to 10 weight percent of cupric oxide and from about 2 to 10 weight percent of chromic oxide as a first promoter level and thereover from about 0.0025 to 0.1 weight percent of palladium as a second promoter level, said percentages being based on the weight of the stabilized support.

The support material useful in the present invention is a porous shaped base in the form of a nodule, pill, or extrudate. The porous support may be exclusively alumina, preferably as gamma-alumina, or it may be alumina in combination with a minor amount of silica, i.e. up to about 10 weight percent silica based on the total weight of base material.

The support is first stabilized against excessive shrinkage during use by appropriate treatment. Heating at a temperature of about 1800°F. is effective in some cases. A preferred procedure to effect the desired stability is to treat the support after an initial conventional calcination with an alkaline earth metal compound and then calcine the treated support at 1800°F. for a time sufficient to effect the desired stabilization. It is generally preferable to dry the treated support after treatment but before the high temperature calcination and such drying is preferably carried out at 250°F. for about an hour. The time of calcination may vary widely depending upon the nature of the support, the amount of treating agent applied, and other factors. Generally times of about 1 to 5 hours are suitable, with a time of about 3 hours being preferred. The temperature reached during calcination is preferably about 1800°F. Lower temperatures generally do not achieve optimum stability in use and higher temperatures tend to have an adverse effect on support properties, particularly porosity.

The amount of alkaline earth metal compound employed in treating the support material should be sufficient to provide from about 1.5 to 10 weight percent of alkaline earth metal oxide based on the weight of the stabilized support. Lower levels of treatment do not significantly improve stability over use of no treating agent while higher levels interfere with catalyst activity. A preferred level is in the range of about 2 to 5 weight percent and more preferably a level of about 3 weight percent is employed. Useful alkaline earth metal oxides are those of calcium which are greatly preferred, barium, strontium, and magnesium. Any alkaline earth metal compound of the metals designated which will yield the desired oxide upon calcination may be employed. It is generally preferred to employ water-soluble alkaline earth metal compounds in aqueous solution as treating medium. Calcium nitrate is a preferred water-soluble salt yielding the stabilizing oxide.

After the support is stabilized by treatment as described above, it is next impregnated with a homogeneous solution of a combination of a copper compound and a chromium compound followed by conventional calcination to convert said compounds to the corresponding oxides. The amount of copper compound employed should be sufficient to provide from about 2 to 10 weight percent of copper oxide based on the weight of the stabilized support. The amount of chromium compound employed should be sufficient to provide from about 2 to 10 weight percent of chromic oxide based on the weight of the stabilized support. Lower amounts of these stabilizers generally do not provide the desired catalytic activity. Although higher amounts may be employed, such amounts increase costs unnecessarily, do not provide significant advantage in activity, and unnecessarily increase density. Preferred amounts of cupric oxide are between about 4 and 6 weight percent and of chromic oxide, between about 1.5 and 4.5 weight percent, same basis. It is preferred to employ water-soluble salts in aqueous medium in effecting the impregnation. Salts selected should be compatible in solution in order to obtain the uniform distribution of the combination of oxides upon calcination. After impregnation is effected to provide the proper amounts of promoter materials, the impregnated support is calcined at conventional temperatures, i.e. about 1100°F, for about an hour to convert the metal compounds to the corresponding oxides. The particular time and temperature of calcination may vary widely so long as the oxides are obtained. If desired, the impregnated support may be dried prior to calcination or calcination may be effected directly on the wet support, the latter procedure being referred to as "quick calcination". If predrying is employed, it may be by use of an oven at 250°F. for a time sufficient to remove most of the impregnation medium, usually water.

After the uniform distribution of cupric oxide and chromic oxide has been obtained as a first promoter level on the stabilized alumina support, the support is next coated with palladium. This is effected by use of a solution of a palladium compound which upon calcination yields palladium metal. It is preferred to use water-soluble palladium compounds in an aqueous medium. The amount of palladium compound employed should be sufficient to provide from about 0.0025 to 0.1 weight percent of palladium based on the weight of the stabilized support. Lower amounts do not provide the desired activity or resistance to poisoning. Higher amounts offer no particular advantage over the range stated and tend to increase costs unnecessarily. After coating is effected by suitable means, such as spraying the solution on the support, the coated support is calcined as described above to convert the palladium compound to palladium metal. Conventional cycles of calcination are contemplated in addition to the preferred temperature cited. Following calcination, the catalyst material is ready for use in exhaust gas conversion.

The radial distribution of palladium in a catalyst preparation typical of the present invention has been obtained by the following experimental procedure.

X-Ray Microprobe Analysis by the Energy Dispersive Method with the Scanning Electron Microscope Pellets of a catalyst sample prepared in accordance with the present invention are fractured transversely and the exposed surface is examined radially for the presence of palladium. Three areas on each pellet are scanned corresponding to (a) edge, (b) ½ the radius of the pellet, and (c) the center of the pellet. From the concentrations of palladium detected at the various points of scanning, the distribution of palladium is then determined. For test purposes, the individual catalyst preparations are tested in triplicate and the results reported are the average of the individual determinations.

The results of tests performed as described above on typical catalyst preparations of the present invention are as follows:

In areas (b) and (c), either no detectable palladium or a barely detectable amount of palladium is seen. In area (a), a significant amount of palladium is seen. The experimental observations indicate that catalysts prepared in accordance with the present invention possess a concentration gradient with respect to palladium, with the palladium concentrated in the outer periphery of the catalyst pellet.

In addition to use in an exhaust muffler device, the catalyst of the present invention may be used in other exhaust purifying devices. The catalyst material may also be employed to inert airplane fuel tanks in conjunction with appropriate devices for that purpose.

The catalyst material of the present invention has an exceptional combination of properties that makes it ideally suited for use in catalytic exhaust muffler. Such properties include very high activity, very good resistance to poisons such as sulfur, good high temperature stability as to activity, low shrinkage, low compacted bulk density, high resistance to attrition, good crush strength, and even distribution of promoters. These desirable properties are obtained at low promoter levels, thereby offering an economic advantage.

The invention is illustrated by the examples which follow wherein all parts and percentages are by weight unless otherwise specifically stated.

EXAMPLE 1

A. Stabilization of Support

Five pounds of 1/10 inch diameter alumina-silica extrudates, which were prepared by mulling an alumina-silica powder with water and ammonia and extruding the mulled mixture, were oven-dried at 250°F. and then calcined at 1100°F. The calcined extrudates were treated by spraying using 2.47 liters of an aqueous solution containing 0.65 pound of calcium nitrate tetrahydrate. The treated extrudates were then oven dried at 250°F. for one hour and then calcined at 1800°F. for three hours to obtain calcium oxide stabilized extrudates containing a nominal 3%, by weight, based on the weight of the original 95:5 alumina:silica calcined extrudates, of calcium oxide.

B. Impregnation of Stabilized Support

A 350 gram portion of the above-stabilized extrudates was spray impregnated with 312 cc. of an aqueous solution containing 58.9 grams of copper nitrate trihydrate and 17.0 grams of chromic acid ($CrO_3$). The impregnated extrudates were quick calcined at 1100°F. to obtain stabilized extrudates having a nominal content of 3% of chromic oxide and 5% of cupric oxide in addition to the 3% of calcium oxide stabilizer.

C. Coating of Impregnated Support

A 92 gram portion of these extrudates was then spray coated with 75 cc. of an aqueous solution containing 0.01 gram of palladium as palladium chloride. The coated extrudates were then quick calcined at 1100°F. to obtain a catalyst material containing nominally 5% by weight of cupric oxide, 3% by weight of chromic oxide and 0.01% by weight of palladium as promoters on a nominal 3% by weight calcium oxide stabilized base of 95:5 alumina:silica, respectively.

EXAMPLE 2

The procedure of Example 1 was followed in every essential detail except that in part C the amount of palladium compound was doubled so as to provide 0.02% palladium as coating on the support.

EXAMPLE 3

The procedure of Example 2 was followed in every essential detail except that in part C the amount of palladium compound was doubled so as to provide 0.04% palladium as coating on the support.

EXAMPLE 4

The procedure of Example 1 was followed in every essential detail except that in part C the amount of palladium compound was reduced to one half so as to provide 0.005% palladium as coating on the support.

EXAMPLE 5

The procedure of Example 4 was followed in every material detail except that in part C the amount of palladium compound was reduced to one half so as to provide a 0.0025% palladium as a coating on the support.

EXAMPLE 6

The procedure of Example 1 was followed in every material detail except that in part B the amounts of copper and chronium were increased so as to obtain a catalyst material containing nominally 9% of cupric oxide, 6% of chromic oxide, and 0.01% of palladium as promoters on a nominal 3% calcium oxide stabilized base of 95:5 alumina:silica, respectively.

COMPARATIVE EXAMPLE A

The procedure of Example 1 was repeated in every essential detail except that part C, coating with palladium compound, was omitted. As a result, the final catalyst material contained 5% cupric oxide and 3% chromic oxide on a 3% calcium oxide stabilized base of 95:5 alumina:silica, respectively, without palladium.

COMPARATIVE EXAMPLE B

In this example an attempt is made to prepare a catalyst by the procedure described in U.S. Pat. No. 3,288,558. Example I of the reference contains numerous errors with respect to the valence states of promoter metals and in the ratio of salts used to obtain the required promoter loadings. Example III of the reference expresses the promoter loadings in terms of percentages and is relied upon for such information. However, Example III of the reference relies upon the procedure of Example I thereof to indicate first treatment of promoter materials and thus is difficult to follow for this reason. Essentially, what is done, therefore, to prepare the catalyst material for comparative purposes is to follow Example III of the reference for what it properly teaches and to obtain promoter levels in the first impregnation consistent with Example III. In this manner, a showing as to the effect of promoter distribution on performance of the catalyst material resulting can be made in spite of the inoperability of the examples of the reference.

Accordingly, a portion of the stabilized base prepared in accordance with part A of Example 1 was employed. The base was first impregnated with an aqueous solution containing sufficient copper compound and palladium compound to deposit on the base 5 weight percent of cupric oxide and 0.01 weight percent of palladium after quick calcination at 1100°F. The calcined base was then reimpregnated with sufficient of an aqueous solution of ammonium chromate to provide 3% of chromia in the final catalyst material.

After reimpregnation, the base was dried at 260°F. in a stream of air. The dried catalyst was then charged to a cold muffle furnace and heated to a temperature of 1400°F. in an atmosphere of air for a period of 3 hours.

EXAMPLE 7

The various catalyst prepared above were tested for catalytic activity under three different conditions of exposure: (a) as freshly prepared, (b) after ageing at 1800°F. for 24 hours, and (c) after rapid ageing treatment with sulfur dioxide.

In carrying out the rapid ageing treatment with sulfur dioxide, the following procedure was employed. Thirty-five cubic centimeters of the catalyst material was charged to a metal reactor tube of 1-inch diameter. One hundred cc. of inert alumina beads were charged above the catalyst material and served as a preheating section. An electric furnace was employed to heat the preheating section to 290°C. The catalytic bed was not heated externally. This was done to simulate the situation that exists in the catalytic converter as it is operated in conjunction with an automobile. After the preheater reached the temperature of 290°C. and was stabilized at this value, the gas feed was introduced. In an oxygen deficient cycle, the nominal composition of the feed was 6.0% CO, 1.5% $O_2$, and the balance $N_2$. In the excess oxygen cycle, the nominal composition was 6.0% CO, 4.5% $O_2$, and the balance $N_2$. An electric timer and selenoid valves were used to vary the gas composition every 7.5 minutes. The total flow rate of the feed was 8170 cc./min. in the reducing mode and 8410 cc./min. in the oxidizing mode. The space velocity was approximately 13000 $hr^{-1}$.

Once the feed was introduced and the system was stabilized, $SO_2$ was introduced at a flow rate of 60 cc./min. The catalyst was exposed to the CO, $O_2$, $N_2$, and $SO_2$ mixtures for exactly one hour. During the one hour period, the hot spot of the catalyst bed was measured as an approximation of the catalyst's resistance to sulfur. After the one hour exposure to $SO_2$ the catalyst was removed and tested for activity. A comparison of the 50% conversion temperatures for hydrocarbons and carbon monoxide for fresh and rapid aged catalyst indicated the relative resistance of the catalyst to sulfur poisoning.

The catalytic activity of the various samples of catalyst materials was determined by the following test procedure. This activity test was designed to determine the 50% conversion temperatures for hydrocarbons and carbon monoxide, the 50% conversion being that temperature at which 50% of the particular gas, hydrocarbon or carbon monoxide, in the feed is oxidized. A bottled gas mixture of 1% CO, 250 parts per million of propylene, 2.5% $O_2$, and the balance $N_2$ was employed to simulate raw exhaust gas. The catalysts were heated to 1100°F. and then allowed to cool to ambient temperature. During this period, at approximate intervals of 75°F., sample of the exit gas were taken and percent conversions were calculated. A plot of percent conversion versus temperature was made and from the plot the 50% conversion temperature was determined.

The exhaust unit was designed so that four catalyst materials can be tested at the same time. Before the catalysts were charged into the reactor tubes, they were calcined at 850°F. for one hour to remove any water they may have adsorbed prior to testing. 12.5 cubic centimeters of catalyst material under test was charged to each reactor tube. A space velocity of 13,200 $hr.^{-1}$ was achieved at a flow rate of approximately 5.8 standard cubic feet per hour. The catalysts were heated to 1100°F., the furnace turned off, and the sample gas introduced. Before reaching the catalysts, the gas passed through a water saturator set at 115°F. As the catalysts cooled, samples of the exit gas were taken according to the above schedule.

The CO analysis was performed by a MSA Carbon Monoxide Alarm, Model 701. The hydrocarbon analysis was performed by a Beckman Hydrocarbon Analyzer, Model 109-A. For both analyses, a 100 cc syringe sample was required.

The results of the various tests are given below in Table I.

TABLE I

| Catalyst Of Example | CATALYST ACTIVITY - 50% CONVERSION °F. | | | | | |
|---|---|---|---|---|---|---|
| | Fresh | | Heated AT 1800°F. -24 Hours | | Rapid Aged - SO$_2$ | |
| | Hydrocarbon | CO | Hydrocarbon | CO | Hydrocarbon | CO |
| 1 | 516 | 468 | 642 | 549 | 552 | 592 |
| 2 | 505 | 460 | 585 | 527 | 545 | 572 |
| 3 | 511 | 460 | — | — | 536 | 599 |
| 4 | 509 | 453 | 644 | 595 | 597 | 633 |
| 5 | 520 | 473 | 680 | 626 | 606 | 675 |
| 6 | 514 | 464 | 718 | 635 | 568 | 592 |
| A | 495 | 444 | 639 | 583 | 617 | 851 |
| B | 547 | 511 | 619 | 588 | 646 | 707 |

The data given in Table I show the improved performance of catalysts of the present invention compared to prior art catalysts in 50% conversion temperature of carbon monoxide after rapid ageing with sulfur dioxide.

We claim:
1. A process for treating exhaust gases from internal combustion engines to oxidize the air pollutants therein which comprises contacting said gases with catalyst material consisting essentially of an alumina support stabilized against excessive shrinkage by treatment with an alkaline earth metal compound and calcination at 1800°F., said support uniformly impregnated with from about 2 to 10 weight percent of cupric oxide and from about 2 to 10 weight percent of chromic oxide as a first promoter level and thereover from about 0.0025 to 0.1 weight percent of palladium as a second promoter level, said percentages being based on the weight of the stabilized support.

* * * * *